Jan. 29, 1929.  
M. W. P. McNAMARA  
1,700,507

FISH PLATE

Filed May 25, 1928

Witnesses:
C. E. Wessels.
F. C. Appleton

Inventor:
Michael W. P. McNamara,
By Joshua R. H. Potts
his Attorney.

Patented Jan. 29, 1929.

1,700,507

UNITED STATES PATENT OFFICE.

MICHAEL W. P. McNAMARA, OF CHICAGO, ILLINOIS.

FISHPLATE.

Application filed May 25, 1928. Serial No. 280,412.

This invention relates to improvements in means for joining and connecting rails, and has for its object the provision of a device of the character described, whereby a more effective joining of rails may be obtained.

A further object of the invention is to provide an improved fish plate connection between rails such as are used in railroad and similar construction, in conjunction with means for permitting the usual expansion and contraction to which these members are subjected, due to changes in atmospheric temperature.

Other objects and advantages of the invention will appear more fully in the hereinafter specification when taken in connection with the accompanying drawings in which, Fig. 1 is a side elevation of the invention applied to the meeting ends of two railroad rails;

Figure 1:
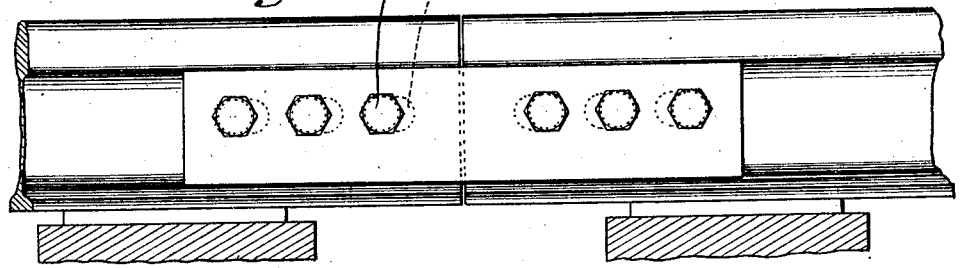
Figure 2:
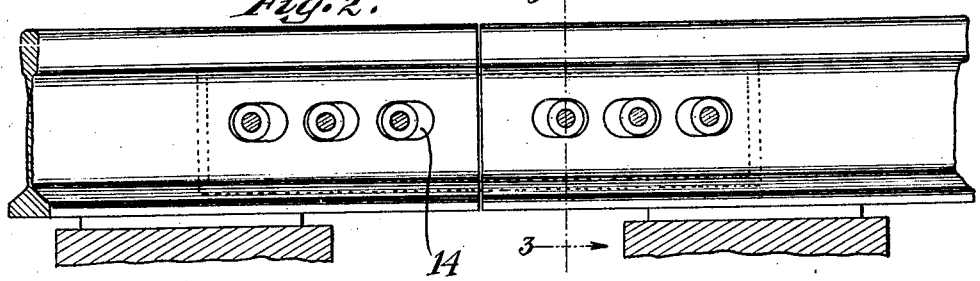
Fig. 2 is a view similar to Fig. 1 with the adjacent female plate removed to show the form of apertures in the web of the rails adapted to allow for expansion and contraction.
Figures 3, 5:
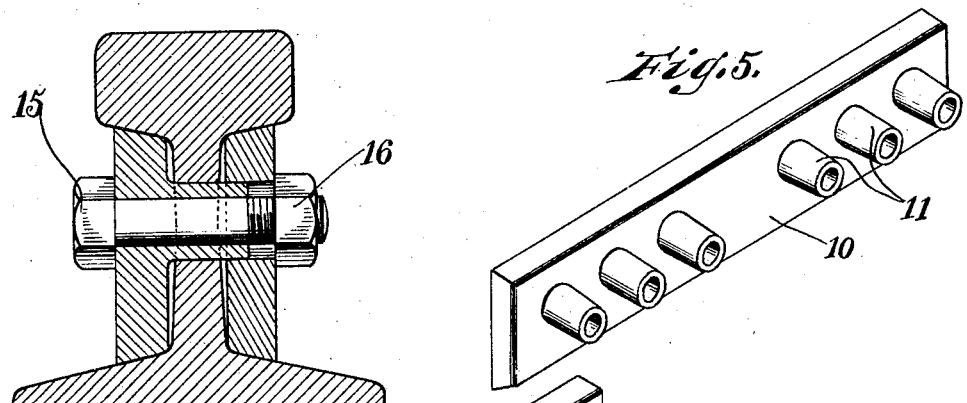
Fig. 3 is a cross section taken on line 3—3 of Fig. 2.
Fig. 5 is a perspective view of the male fish plate member.
Figure 4:
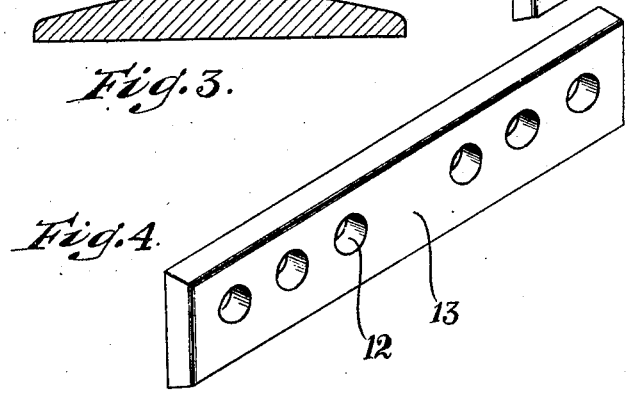
Fig. 4 is a perspective view of the female fish plate member.

Referring more particularly to the drawings which illustrate the preferred embodiment of the invention, and in which similar figures of reference are applied to like parts in the various views, a male fish plate member 10 is provided with laterally extending perforated bosses 11 adapted to be received by apertures 12 in a female fish plate member 13. The web of each rail end is provided with longitudinally elongated apertures 14 which are adapted to register with apertures 12 in the female member 13, and the purpose in making the apertures 14 of greater length than the diameter of the bosses 11, as shown, is to allow for relative movement between the rail ends and the fish plates necessitated by the normal expansion and contraction due to temperature changes. An effective joining of the respective parts is made by applying the male member 10 upon one side of the ends of a pair of rails with the bosses 11 extending through registering apertures 14 is the web of the rail. The female member 13 is then applied to the opposite side of the rail with the bosses 11 projecting into respective apertures 12. The assembly is then secured by bolts 15 which extend through perforated bosses 11, and upon which are screw threaded nuts 16 whereby the male and female fish plates and consequently the rails are rigidly joined, at the same time having provision for such expansion or contraction as may occur.

The novel type of fish plate effectuates a more rigid conjunction of rails as ordinarily used in street car or railroad service. The bosses are preferably slightly tapered in order to obtain a wedging effect at the point of application to the rail. As is obvious from an inspection of the plates, their application is a simple operation and requires no more time or skill than in applying fish plates of the conventional type.

While I have illustrated and described the preferred form of construction for carrying my invention into effect, this is capable of variation and modification without departing from the spirit of the invention. I, therefore, do not wish to be limited to the precise construction as set forth, but desire to avail myself of such variations and modifications as come within the scope of the appended claims.

Having described my invention, what I claim as new and desire to secure by Letters Patent is:

1. The combination with abutting rail ends of a fish plate comprising a male member having a plurality of bolt receiving tapered bosses; said bosses being adapted to enter registering holes in the web of a rail; a female fish plate member adapted to coact with said male fish plate member in connecting said rail ends together; and means for permitting relative movement between said rail ends and said fish plate members to allow for expansion and contraction.

2. The combination with abutting rail ends of a male fish plate member having a plurality of integral bolt receiving tapered bosses; said male fish plate member adapted to register and coact wedgingly with a female fish plate member; and means for permitting relative movement between said rail ends and said fish plate members to allow for expansion and contraction.

3. The combination with abutting rail ends of a fish plate comprising a male member having a plurality of bolt receiving tapered bosses; said bosses being adapted to enter registering holes in the web of a rail; a female fish plate member adapted to coact with said male fish plate member for connecting said rail ends in a wedging manner; said rail web holes being elongated to permit relative movement between the rails and fish plate members due to expansion and contraction.

4. The combination with abutting rail ends of a male fish plate member having a plurality of integral bolt receiving tapered bosses; said male fish plate member being adapted to register and coact wedgingly with a female fish plate member; longitudinally elongated apertures in said rail ends adapted to receive said tapered bosses and permit relative movement between the rail ends and the fish plate members due to expansion and contraction.

5. The combination with abutting rail ends of a device for joining said ends together comprising a male fish plate having a plurality of spaced perforated tapered bosses; a female fish plate having a plurality of spaced boss receiving perforations; a plurality of boss receiving apertures in said rail ends; said bosses and perforations being adapted to receive bolts passed therethrough whereby the rail ends may be joined together; and means for permitting relative movement between said rail ends and said fish plate members due to expansion and contraction.

6. The combination with abutting rail ends of a device for joining said ends together comprising a male fish plate having a plurality of spaced perforated tapered bosses; a female fish plate having a plurality of spaced boss receiving perforations; said bosses and perforations being adapted to receive bolts passed therethrough whereby rails may be joined together; said rail ends being provided with elongated boss receiving apertures permitting relative movement between said rail ends and said fish plate members to allow for expansion and contraction.

In testimony whereof I have signed my name to this specification.

MICHAEL W. P. McNAMARA.